May 18, 1943.  F. J. VONDRACEK  2,319,483

LAWN MOWER

Filed July 12, 1940

INVENTOR.
FRANK J. VONDRACEK
BY
Flournoy Corey
ATTORNEY.

Patented May 18, 1943

2,319,483

UNITED STATES PATENT OFFICE 2,319,483

LAWN MOWER

Frank J. Vondracek, Cedar Rapids, Iowa, assignor of one-tenth to Fred Kubias and one-tenth to Ernest Kosek, both of Cedar Rapids, Iowa Application July 12, 1940, Serial No. 345,150

12 Claims. (Cl. 56—294)

This invention relates to lawn mowers and has particular relation to means for regulating and adjusting the cutter mechanism of such devices.

It has been my experience with lawn mowers in general that most of the difficulties encountered and the improper operation of mowers are directly caused by improper adjustment of the cutting elements. Most of these devices of the prior art require tools in making adjustment as well as considerable skill on the part of the person making the adjustments.

The adjustment of the cutter bar is quite delicate and, as it is the usual practice to adjust this bar on each end separately, the bar may easily be distorted or sprung out of shape so as to make it almost impossible to make any effective subsequent adjustments.

It is, therefore, among the broad general objects of my invention to provide, in a lawn mower, a relatively simple, quickly operable, positive-acting mechanism by which any person, however unskilled, may, without the use of any tools, adjust the cutting elements as often as required to maintain the mower in the best possible condition for operation.

It is another object of my invention to provide a new and improved means for adjusting the cutter bar of a mower whereby a single, simple adjustment serves to properly adjust and regulate the cutter bar throughout its entire length.

Another object of my invention is to provide cutter bar adjusting means which are not only somewhat resilient in themselves, but which permit extreme accuracy of adjustment without the necessity for extreme care on the part of the operator.

Additional objects of my invention are to provide means for preventing the entanglement of grass and weeds around the cutter reel spindle beyond the ends of the cutting blades and, further, to provide a mowing device in which the various parts, adjusting means and the like, are positioned so as not to interfere in any way with flying grass.

Other and further features and objects of the invention will be more apparent to those skilled in the art upon a consideration of the accompanying drawing and following specification, wherein is disclosed a single exemplary embodiment of the invention, with the understanding, however, that such changes may be made therein as fall within the scope of the appended claims, without departing from the spirit of the invention.

Figure 1:
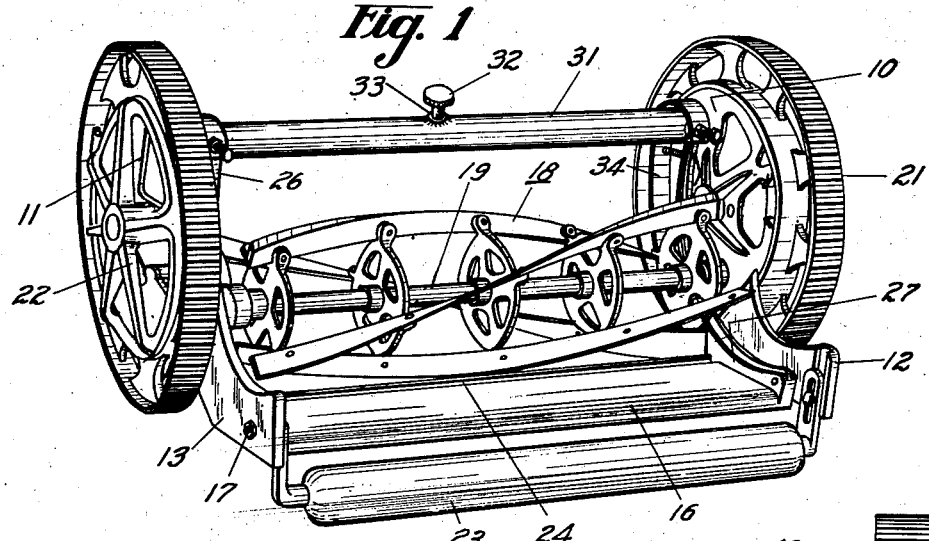
Figure 1 is a view in perspective of a lawn mower embodying an adjusting device constructed in accordance with a preferred embodiment of my invention.
Figure 2:
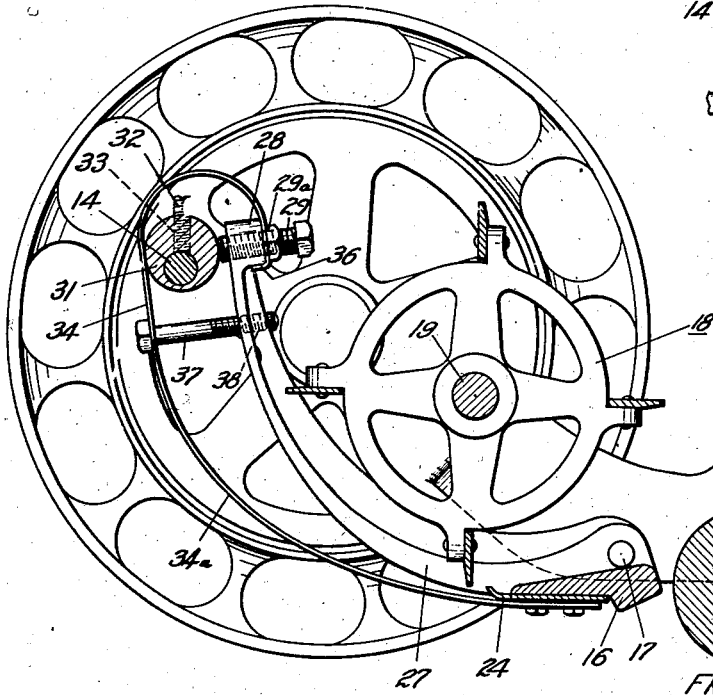
Figure 2 is a view partly in end elevation and partly in section, of the mower shown in Figure 1, to better illustrate the cutter blade adjusting mechanism.

Referring now to the drawing:

The lawn mower illustrated comprises, in general, side plates 10 and 11, each having rearward extensions 12 and 13, the side plates and extensions spaced apart by a forward truss bar 14 (Figure 2), and the cutter bar body 16 which is pivotally mounted by means of bolts 17 between the side plate extensions.

A cutting reel or wheel 18 mounted on a spindle 19 is received for rotation between the side plates. The cutting reel spindle may be provided with spur gears engageable with internal teeth (not shown), in the wheels 21 and 22, for driving the cutting reel when the mower is pushed over the lawn. The rear end of the mower is supported by the roller 23 in accordance with usual practice.

The cutter blade 24 riveted or otherwise attached to the cutter bar body 16 is adapted to be pivoted about its mounting bolts 17 to permit adjustment of the cutter bar relative to the cutter reel.

Adjustment arms 26 and 27 extend forwardly and upwardly from the ends of the cutter blade and these arms may be cast or formed integral with the cutter bar body or may be riveted or bolted thereto. The arms are preferably curved as shown so as to avoid the cutter reel, and the upper outer end of each arm is provided with a boss or enlarged portion 28 in which an adjusting screw 29 is threadedly received.

Each adjusting screw is positioned so that it bears against a tubular cam-like member 31. This adjusting cam may comprise a length of tubing with plugged ends and with aligned openings passing through the ends in off-center position. This cam-like member is mounted for rotation on the forward truss and the rotation of the cam tube will, of course, move the upper ends of the adjusting arms away from the truss bar or permit the arms to approach the truss bar.

A combined handle and locking device 32 includes a threaded rod or the like threadedly received in an opening 33 in the cam tube, and this locking member may be screwed down against the truss rod 14 to prevent rotation of the cam tube.

It will now be apparent that the cam tube may be rotated as desired to regulate the position of the cutter bar relative to the cutter reel blades, and a very fine adjustment may be secured due to the length of the adjusting arms.

I have provided a spring retainer member 34 of flat spring material for holding the adjusting arms in close engagement with the adjusting cam.

This spring retainer is preferably hooked, as at 36, so as to engage behind the enlarged upper end of the adjustment arm, and is provided with an opening for reception over the adjusting screw 29. A lock nut 29a serves not only to lock the adjusting screw, but also to fasten the spring retainer in place. This retainer is shaped in substantially semi-cylindrical form so as to engage the cam tube on its side opposite the adjusting screw 29. A spring adjusting screw 37, passing through an opening in the spring, is threadedly received in an opening 38 in the adjusting arm and the pressure and binding effect of the spring on the cam tube may, of course, be readily regulated by this screw.

It is preferable that this spring retainer be bowed downwardly as shown at 34a and secured at its lower end to the end of the cutter bar 24 for two main reasons; first, the spring is reinforced against permanent distortion by the adjusting screw 37; and second, the bowed portion 34a of the spring serves to deflect tall grass and weeds and prevent them from becoming entangled about the spindle 19 of the cutter reel.

Figure 3:
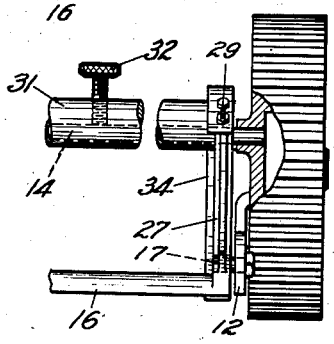
Figure 3 is a fragmentary view in side elevation of the device shown in Figures 1 and 2.

This spring may be made of any suitable width, but it is preferable that it be of a width somewhat greater than that of the adjusting arms so as to extend inwardly beyond those arms, as shown in Figure 3, so as to overlap the cutting blades of the cutter reel.

It will be apparent that a mower constructed in accordance with my invention will have numerous advantages over mowers as constructed heretofore.

The cutter blade may be adjusted throughout its entire length in one operation. Means are provided, however, for adjusting each end of the cutter bar separately if required. The single adjustment is readily accessible.

An extremely fine adjustment may be secured due to the length of the adjustment arms, and still no great care is required by the person making the adjustment.

The cutter bar is very solid and yet is given a certain amount of desirable resilience due to the length of the arms.

It will be apparent that modifications may be made by those skilled in the art. For example, the tubular cam member shown may take any other desirable form, such as a pair of spaced cam members with any suitable connecting means for causing both cam members to be operated simultaneously.

I claim as my invention:

1. In a lawn mower having side plates, a rotary cutter reel mounted for rotation therebetween, a cutter bar mounted between the side plates for cooperation with the cutter reel, a truss bar mounted at a spaced distance above and ahead of the cutter bar and between the side plates for uniting the said side plates, adjusting arms extending upwardly and forwardly from the ends of the cutter bar and terminating adjacent the truss bar, a unitary cam-like member mounted for rotation on the truss bar, and means for holding the adjusting arms in engagement with the cam-like member adjacent the ends thereof.

2. In a lawn mower having side plates and a cutting reel and cooperating cutter bar mounted therebetween, adjusting arms extending forwardly and upwardly from the cutter bar, a unitary cam-like member mounted substantially above the cutter reel for rotation between the side plates, and yoke means on the ends of the arms engaging the cam-like member on opposite sides thereof for holding the adjusting arms and the cam-like member in engagement with each other.

3. In a lawn mower having side plates and a cutting reel and cutter bar mounted therebetween, means for adjusting the cutter bar relative to the cutting reel comprising at least one cam-like member mounted for rotation above, parallel to and in front of the axis of the cutting reel, adjusting means, comprising arms extending forwardly and upwardly from the ends of the cutter bar, engageable with the cam-like member adjacent the ends thereof, means for holding the ends of said arms in close engagement with the cam-like member, and means for locking the cam-like member to prevent rotation thereof.

4. In a lawn mower having a cutting reel and a cutter bar supported in adjustable relation thereto, a cam-like member rotatably supported above, parallel to, and forwardly of the cutting reel, adjustment arms extending forwardly and upwardly from the ends of the cutter bar, adjustable means on the adjustment arms disposed for engagement with the cam-like member, resilient means for holding the adjustable means and the cam-like member in close engagement, and means for locking the cam-like member to prevent rotation thereof.

5. In a lawn mower including side plates and a cutter bar and a cutting reel mounted on a spindle therebetween, lever arms extending forwardly and upwardly from the ends of the cutter bar, a single eccentric means mounted for rotation forwardly of the cutting reel, parallel thereto and engageable with the free ends of the lever arms, leaf spring retainer members, extending below the cutting reel spindle, engaged at their lower ends adjacent the lower ends of the lever arms and having their other ends in engagement with the eccentric means on the side thereof opposite the lever arms, and means for adjusting the pressure of the spring members on the eccentric, the lower surface of the said leaf spring retainers being slanted downwardly toward the rear to deflect grass and weeds from the spindle of the cutter reel.

6. In a lawn mower having side plates, a cutter reel and cutter blade mounted therebetween, a truss bar mounted forwardly of the cutter reel and between the side plates, adjustment arms extending forwardly from the ends of the cutter blade to positions adjacent the ends of the truss bar, cam-like means rotatable about the truss bar for moving the ends of the adjustment arms toward or away from the truss bar for adjusting the cutter bar, and clamping means associated with the cam-like means for preventing rotation of the cam-like member relative to the truss bar.

7. In a lawn mower having side plates and a cutter reel and cutter blade mounted therebetween, relatively long adjustment arms extending forwardly and upwardly from both ends of the cutter blade to positions beyond the cutter reel and closely adjacent the side plates, and means, rotatably engaging the arms, mounted on the side plates and operatively connected together for simultaneous movement, for adjustably positioning the cutter blade relative to the cutter reel.

8. In a lawn mower having a frame including a pair of side plates, a cutter reel and pivotally mounted cutter bar disposed therebetween and a truss bar affixed to the side plates above and ahead of the cutter reel for holding the side plates in spaced relation, a cutter bar adjusting means comprising a tube mounted in off-center position for rotation on the truss bar, an adjusting handle threadedly engaged in an opening through the wall of the tube and adapted to bring to bear against the truss bar for preventing rotation of the said tube, a pair of cutter bar adjusting arms, one extending forwardly and upwardly from each end of the cutter bar to a position close to the tube and to the respective side plates, spacing means slidably engaging the tube surface, including bolts threaded in holes in the free ends of the adjusting arms for locking the opposite ends of the cutter bar.

9. In a lawn mower having a pair of side plates, an upper truss bar spacing and joining the side plates, a cutter reel and a pivotally mounted cutter bar disposed between the side plates, arms extending forwardly from the ends of the cutter bar, and means associated with the upper truss bar for moving the forward ends of the arms to adjust the cutter bar, each of said arms including a portion arcuate in shape and a width suitable to extend below the cutter reel at an end thereof and abut the adjacent side plates whereby tall grasses will be diverted and prevented from becoming entangled around the spindle of the cutter reel.

10. In a lawn mower having side plates and a cutter reel and cutter blade mounted therebetween, the side plates being connected by a forward truss bar, the cutter blade being pivotally engaged to the side plates, whereby the blade may be tilted to adjust cutting relation thereof with the cutter reel, at last one arm secured to the cutter blade extending forwardly and upwardly to a position in proximity to the truss bar, and adjusting means engaging the truss bar and the forward upward portion of the arm for varying the spacing between the truss bar and the arm to tilt the cutter bar to secure any desired relation of adjustment between the blades on the reel and the cutting bar.

11. In a lawn mower having side plates and a cutter reel and cutter blade mounted therebetween the cutter blade being pivotally engaged to the side plates whereby the blade may be tilted to adjust cutting relation thereof with the blades of the cutter reel, an arm secured to the cutter blade and extending forwardly and upwardly toward the truss bar and adjusting means between the arm and truss bar utilizing the truss bar as a fulcrum for tilting the cutter blade.

12. In a lawn mower having side plates and a truss bar, a cutter reel and cutter blade mounted between the side plate, the cutter blade being pivotally engaged to the side plates, an arm, secured to the cutter blade, extending upwardly and forwardly, adjusting means between the free end of the arm and the truss bar for tilting the cutter blade, a portion of the arm comprising a resilient member adapted to engage the truss bar on the side thereof opposite the adjusting means to furnish spaced locking means for locking the adjustment once secured.

FRANK J. VONDRACEK.